H. L. McAVOY.
Gas Burner.
No. 50,075.
Patented Sept. 19, 1865.
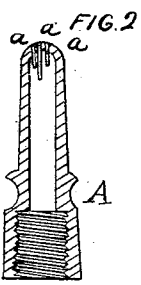
WITNESSES
Philip T. Tilgard
W H Hayward
INVENTOR
Hugh L. McAvoy

UNITED STATES PATENT OFFICE.

HUGH L. McAVOY, OF BALTIMORE, MARYLAND, ASSIGNOR TO HIMSELF AND E. S. HUTCHINSON, OF SAME PLACE.

IMPROVEMENT IN GAS-BURNERS.

Specification forming part of Letters Patent No. 50,075, dated September 19, 1865.

*To all whom it may concern:*

Be it known that I, HUGH L. MCAVOY, of the city and county of Baltimore, and State of Maryland, have invented a new and useful Improvement in Gas-Burners; and I do hereby declare the following to be a full, clear, and exact description of the nature, construction, and operation of the same, reference being had to the accompanying drawings, which are made part of this specification, and in which—

Figure 1 is plan or top view. Fig. 2 is a vertical section.

The same letters refer to corresponding parts in the two figures.

This invention consists in providing the burner with three or more slits for the passage of the gas, which I have found, with the hydrocarbon gas generated from coal-oil, to produce better effect than the single or duplicate slit.

To enable one skilled in the art to which my invention appertains to construct and use the same, I will proceed to describe it.

A is the burner, which is screwed onto the end of the gas pipe or socket in the ordinary manner. Instead of having a single or double opening of any of the ordinary kinds, it has three parallel or nearly parallel slits $a\ a\ a$, Fig. 2.

The burner with the small orifices ordinarily used for the carbureted hydrogen of the gas-works is not suitable for burning the mixture of atmospheric air and hydrocarbon gas as evolved from the hydrocarbon liquid by the passage through it of a body of air. I have made it larger and have brought the sheets of flame issuing therefrom to bear upon each other in such a manner as to unite in producing a general effect.

Having described my invention, what I claim therein as new and desire to secure by Letters Patent, is—

The gas-burner provided, as described, with three or more parallel or nearly parallel slits.

HUGH L. McAVOY.

Witnesses:
PHILIP T. FILYARD,
W. H. HAYWARD.